F. E. FURRER.
TRUCK ADJUSTING MECHANISM.
APPLICATION FILED AUG. 8, 1914.
1,131,050.
Patented Mar. 9, 1915.
2 SHEETS—SHEET 1.
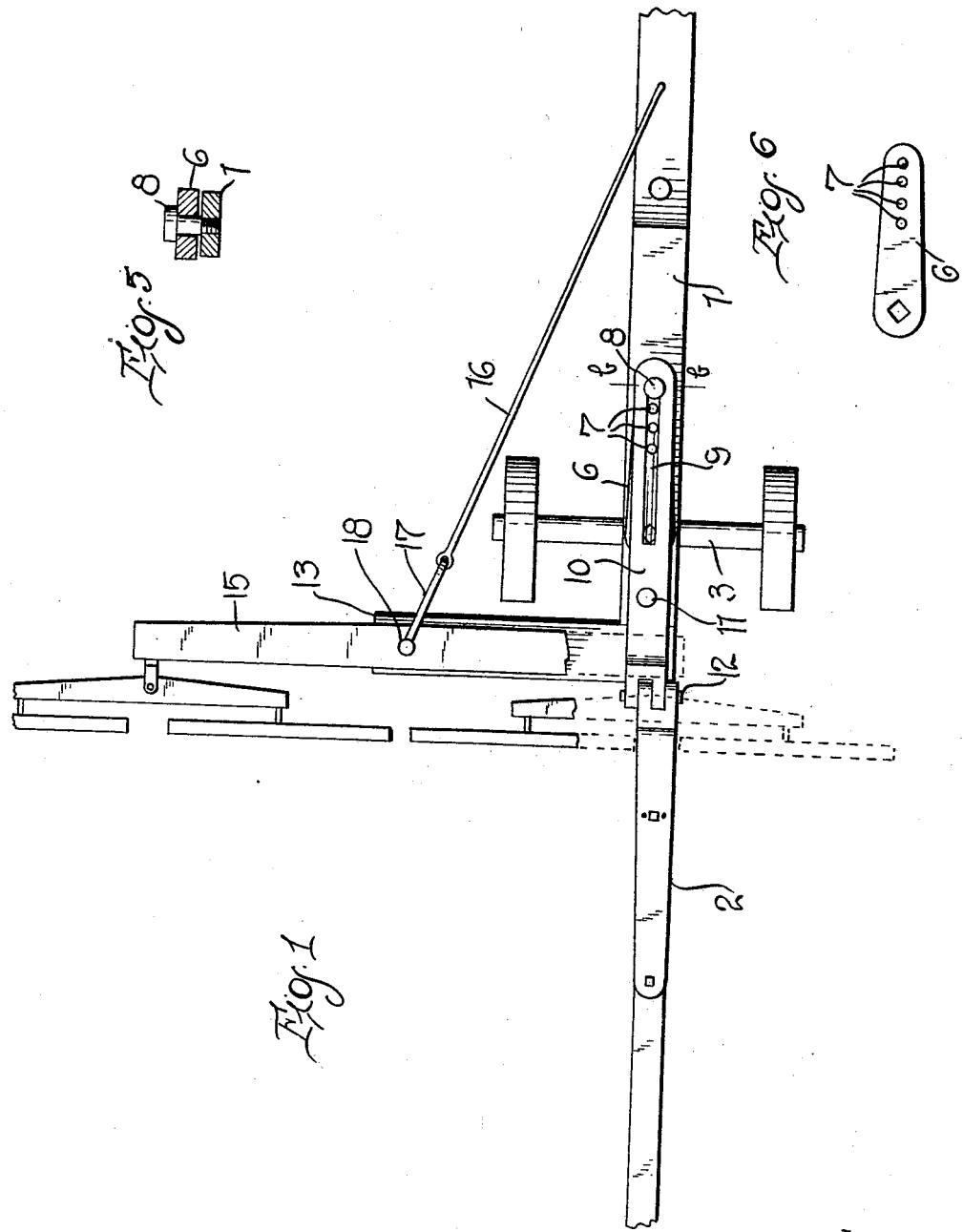
Witnesses
Robert M. Sutphen
A. I. Hind
Inventor
F. E. FURRER
By Watson E. Coleman
Attorney

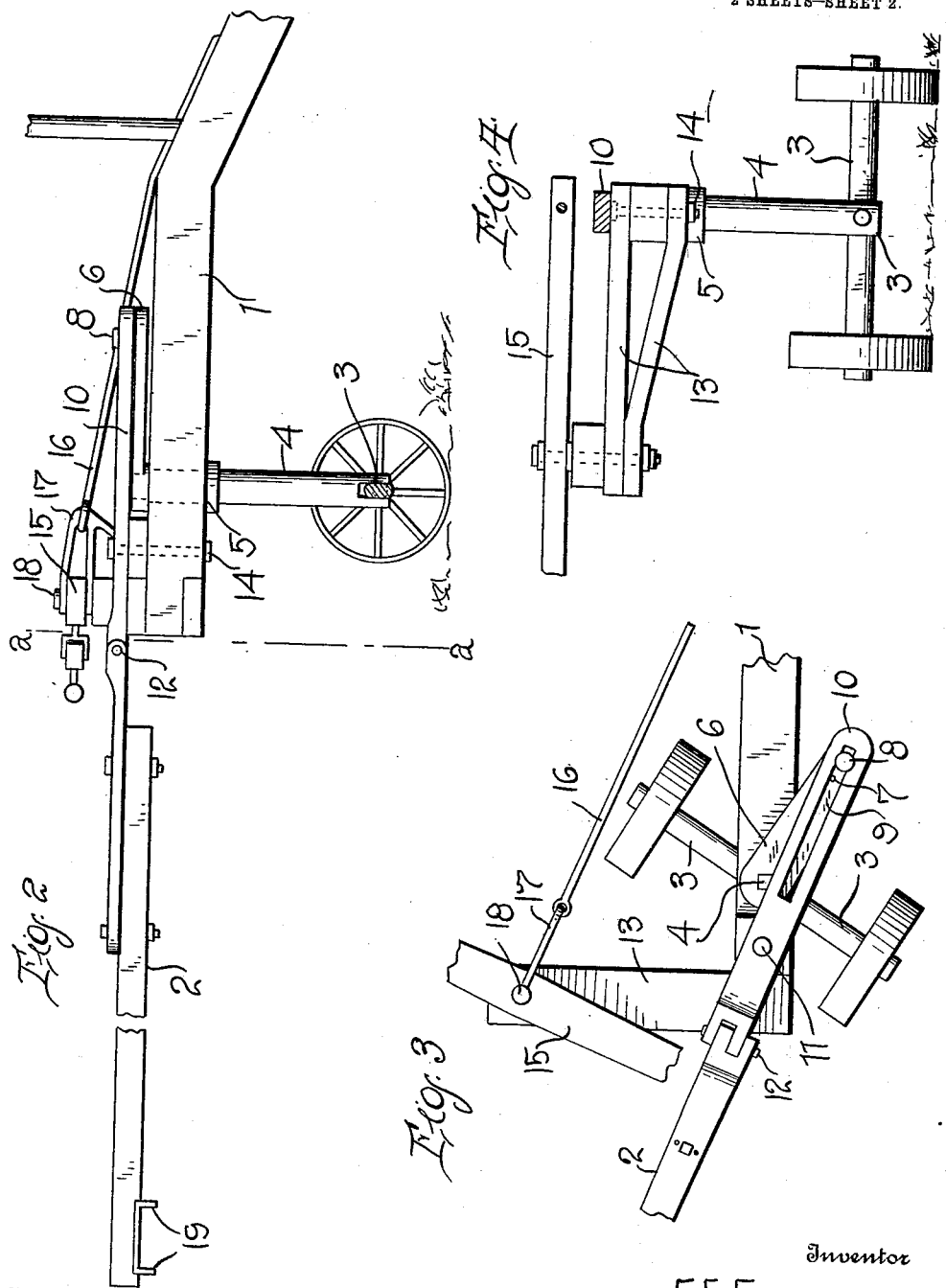

UNITED STATES PATENT OFFICE.

FRANK E. FURRER, OF WISHEK, NORTH DAKOTA.

TRUCK-ADJUSTING MECHANISM.

1,131,050.  Specification of Letters Patent.  Patented Mar. 9, 1915.

Application filed August 8, 1914. Serial No. 855,800.

*To all whom it may concern:*

Be it known that I, FRANK E. FURRER, a citizen of the United States, residing at Wishek, in the county of McIntosh and State of North Dakota, have invented certain new and useful Improvements in Truck-Adjusting Mechanism, of which the following is a specification, reference being had to the accompanying drawings.

My invention relates to certain new and useful improvements in truck adjusting mechanism and has for its object to provide a mechanism by the use of which the truck of binding machines or other machines of like character is caused to travel not only in the same direction as the tongue, but to also travel faster than the tongue in order that the horses may not collide with the reel and that the machine may cut square corners.

With these ends in view my invention consists in the construction and arrangement hereinafter and in detail described.

In order that those familiar with the art to which my invention appertains may know how to make and operate my improved mechanism and fully appreciate its advantages, I will proceed to describe the same referring by numerals to the accompanying drawings in which, Figure 1 is a plan view of the truck mechanism of an ordinary binding machine. Fig. 2 is a side elevation of the same. Fig. 3 is a detail plan view showing the relation of the truck with the tongue when the mechanism has caused the truck to travel somewhat faster upon its king pin than has the tongue. Fig. 4 is a front elevation partly in section on the line A—A of Fig. 2. Fig. 5 is a section on the line b—b of Fig. 1; and Fig. 6 is a detail plan view of the radial arm connected with the upper end of the steering post connected with the truck axle.

Similar reference numerals indicate like parts in the several figures of the drawings.

1 represents a stub tongue and 2 the guiding tongue. The truck 3 is mounted in the bifurcated extremity of the pillar 4 rotatively secured in the stub tongue 1 and it is preferably formed with a collar 5 for an obvious purpose.

The upper extremity of the pillar projects above the stub tongue and is rigidly secured in one end of a radial arm 6, which in its fixed position is at a right angle to the truck 3, as clearly shown at Figs. 1, 2 and 3, and at its rear end is provided with a series of spaced pin or bolt holes 7 to receive an adjusting pin or bolt 8, which passes through a longitudinal slot 9 in what I designate a tongue adjuster 10 pivoted to the forward end of the stub tongue 1, at 11.

The forward end of the tongue adjuster is bifurcated as shown or otherwise formed to be connected by a transverse pivot 12, to the rear end of the guiding tongue 2 in order that the latter may have the necessary vertical vibration.

It will be noted that the pivoted connection between the pillar 4 and the truck 3 permits the latter to adapt itself to the irregularities of the ground over which it may travel.

13 are lateral braces or a frame, rigidly connected to the stub tongue 1 by suitable bolts and nuts 14, and pivotally mounted upon the outer end of these braces or frame, is an ordinary equalizer 15 to which the ordinary double and swingletrees are connected and which it is unnecessary to indicate by numerals.

16 is a brace secured at one end to a triple clevis 17 connected at one end by a bolt 18 passing vertically through the equalizer 15 and the braces or frame 13, and at the other end to the stub tongue 1. This bolt constitutes the fulcrum upon which the equalizer 15 oscillates.

19 are suitable checks to control the yoke and to keep it from slipping off the end of the tongue or sliding backward.

From the construction shown and described, it will be seen that the truck can be changed from right to left or left to right accordingly as the braces or frame 13 are located with reference to the stub tongue.

The object of providing the radial arm 6 with the bolt holes 7, is that the rotative speed of the truck may be increased or diminished, it being understood that the slowest speed is effected by locating the pin or bolt 8 in the bolt hole nearest to the rear end of the arm 6 and the speed is increased accordingly, as this bolt is placed in other bolt holes approaching the forward end of the arm.

I have found from practical experience that with a truck provided with my improved devices, I am enabled to cut substantially square corners while at the same time avoiding any collision of the draft horses with the reel of the machine.

It will be seen that with my improved mechanism between the guiding tongue, the stub tongue and the truck, I am enabled to make the truck turn more rapidly than does the guiding tongue so that square corners may be more readily cut.

What I claim as new and desire to secure by Letters Patent is:—

1. In combination with a truck rotatively mounted in a stub tongue upon a vertical pillar, a radial arm rigidly connected with said pillar, a guiding tongue adjuster pivotally connected to the stub tongue and to the free end of the radial arm by means of a pin or bolt passing through a longitudinal slot in said adjuster and located in a bolt hole in the radial arm substantially as and for the purposes set forth.

2. A truck adjusting mechanism consisting of a rotative truck pillar mounted in a stub tongue, a radial arm rigidly secured to the upper end of the truck pillar and having a series of bolt holes spaced apart at the opposite end, a guiding tongue adjuster formed with a longitudinal slot and pivoted to the stub tongue in advance of said slot, a pin or bolt passing through the longitudinal slot in the adjuster and into one of a series of vertical holes in the radial tongue, and a guiding tongue vibratively connected with the tongue adjuster substantially as hereinbefore set forth.

3. The combination of a stub tongue, of a depending rotatable pillar, a truck carried thereby, a radial arm extending rearward from the pillar and disposed above the stub tongue, a guiding tongue adjuster comprising a bar pivoted intermediate its ends to the stub tongue, the rear extremity of the bar having sliding pivotal engagement with the arm, and a guiding tongue attached to the forward end of the adjuster for common movement in a horizontal plane.

In testimony whereof I hereunto affix my signature in the presence of two witnesses.

FRANK E. FURRER.

Witnesses:
H. E. TIMM,
E. P. PFEIFLE.

Copies of this patent may be obtained for five cents each, by addressing the "Commissioner of Patents, Washington, D. C."